United States Patent
Gupta (10) Patent No.: US 12,260,092 B2
(45) Date of Patent: *Mar. 25, 2025

(54) SYSTEMS AND METHODS FOR GENERATING LOGICAL-TO-PHYSICAL TABLES FOR WEAR-LEVELING

(71) Applicant: Micron Technology, Inc., Boise, ID (US)

(72) Inventor: Rajesh N. Gupta, Bengaluru (IN)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,772

(22) Filed: Sep. 6, 2022

(65) Prior Publication Data
US 2023/0004307 A1    Jan. 5, 2023

Related U.S. Application Data (63) Continuation of application No. 16/727,196, filed on Dec. 26, 2019, now Pat. No. 11,442,631.

(51) Int. Cl.
*G06F 3/06* (2006.01)
*G06F 12/1009* (2016.01)

(52) U.S. Cl.
CPC .......... *G06F 3/0616* (2013.01); *G06F 3/0635* (2013.01); *G06F 3/0659* (2013.01); *G06F 3/0673* (2013.01); *G06F 12/1009* (2013.01); *G06F 2212/1036* (2013.01)

(58) Field of Classification Search
CPC ..... G06F 3/0616; G06F 3/0659; G06F 3/0679
USPC .......................................................... 711/206
See application file for complete search history.

(56) References Cited

U.S. PATENT DOCUMENTS

| | | | |
|---|---|---|---|
| 10,445,229 B1 | 10/2019 | Kuzmin et al. | |
| 2004/0085835 A1 | 5/2004 | Ahn | |
| 2006/0004750 A1 | 1/2006 | Huang | |
| 2008/0016308 A1* | 1/2008 | Bartley | G06F 12/0802 |
| | | | 711/167 |
| 2008/0034153 A1 | 2/2008 | Lee | |
| 2008/0133874 A1* | 6/2008 | Capek | G06F 9/3013 |
| | | | 711/206 |

(Continued)

FOREIGN PATENT DOCUMENTS

| | | | |
|---|---|---|---|
| WO | 2018190962 A1 | 10/2018 | |
| WO | 2019152224 A1 | 8/2019 | |

OTHER PUBLICATIONS

International Search Report and Written Opinion for PCT Application No. PCT/US2020/061312 mailed Mar. 11, 2021 (10 pages).

(Continued)

*Primary Examiner* — Titus Wong
(74) *Attorney, Agent, or Firm* — Fletcher Yoder, P.C.

(57) ABSTRACT

As described herein, an apparatus may include a memory that includes a first portion, a second portion, and a third portion. The apparatus may also include a memory controller that includes a first logical-to-physical table stored in a buffer memory. The memory controller may determine that the first portion is accessed sequential to the second portion and may adjust the first logical-to-physical table to cause a memory transaction performed by the memory controller to access the third portion as opposed to the first portion.

20 Claims, 4 Drawing Sheets

(56) References Cited

U.S. PATENT DOCUMENTS

| | | | |
|---|---|---|---|
| 2008/0313505 A1 | 12/2008 | Lee | |
| 2009/0113121 A1 | 4/2009 | Lee | |
| 2011/0153908 A1 | 6/2011 | Schaefer | |
| 2011/0170860 A1* | 7/2011 | Smith | H04L 45/70 398/25 |
| 2011/0191521 A1 | 8/2011 | Araki | |
| 2011/0267952 A1* | 11/2011 | Ko | H04L 43/0864 370/237 |
| 2012/0297111 A1* | 11/2012 | Hsu | G11C 16/3427 711/E12.008 |
| 2013/0246734 A1* | 9/2013 | Schaefer | G06F 12/063 711/E12.001 |
| 2014/0122774 A1 | 5/2014 | Xian | |
| 2014/0122861 A1 | 5/2014 | El Maghraoui | |
| 2014/0156916 A1 | 6/2014 | Van Aken | |
| 2014/0325127 A1 | 10/2014 | Tanaka | |
| 2015/0169465 A1 | 6/2015 | Slepon | |
| 2016/0124851 A1* | 5/2016 | Cho | G06F 12/0607 711/157 |
| 2016/0179697 A1* | 6/2016 | Park | G06F 12/1027 711/206 |
| 2016/0197722 A1 | 7/2016 | Mothilal | |
| 2016/0378396 A1 | 12/2016 | Ramanujan | |
| 2018/0074715 A1* | 3/2018 | Farmahini-Farahani | G06F 13/1668 |
| 2018/0173619 A1* | 6/2018 | Sivasankaran | G06F 3/0679 |
| 2018/0293174 A1 | 10/2018 | Song et al. | |
| 2018/0314926 A1* | 11/2018 | Schwartz | G06N 3/084 |
| 2018/0322386 A1* | 11/2018 | Sridharan | G06F 9/54 |
| 2019/0205737 A1* | 7/2019 | Bleiweiss | G06N 3/044 |
| 2019/0251038 A1 | 8/2019 | Kang | |
| 2020/0051203 A1* | 2/2020 | Nurvitadhi | G06T 1/60 |
| 2021/0294649 A1* | 9/2021 | Sakthivel | G06N 3/084 |
| 2021/0350212 A1* | 11/2021 | Kalamkar | G06N 3/084 |
| 2022/0058469 A1* | 2/2022 | Schwartz | G06N 3/084 |
| 2022/0066931 A1* | 3/2022 | Ray | G06F 9/30065 |

OTHER PUBLICATIONS

International Search Report and Written Opinion for Application No. EP20905624.1-1224 mailed May 5, 2023 (9 pages).

Zhang et al., "Bloom filter-based wear-leveling scheme for novel hybrid memory architecture," Journal of Computer Applications, Aug. 10, 2018, p. 2230-2235.

* cited by examiner

SYSTEMS AND METHODS FOR GENERATING LOGICAL-TO-PHYSICAL TABLES FOR WEAR-LEVELING

The present application is a continuation of U.S. application Ser. No. 16/727,196, entitled "Memory Operations With Consideration For Wear Leveling," and filed Dec. 26, 2019, now U.S. Pat. No. 11,442,631, which issues on Sep. 13, 2022, the entirety of which is incorporated by reference herein for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Generally, a computing system includes processing circuitry, such as one or more processors or other suitable components, and memory devices, such as chips or integrated circuits. One or more memory devices may be used on a memory module, such as a dual in-line memory module (DIMM), to store data accessible to the processing circuitry. For example, based on a user input to the computing system, the processing circuitry may request that a memory module retrieve data corresponding to the user input from its memory devices. In some instances, the retrieved data may include firmware, or instructions executable by the processing circuitry to perform an operation, and/or may include data to be used as an input for the operation. In addition, in some cases, data output from the operation may be stored in memory, for example, to enable subsequent retrieval. In instances where firmware is retrieved from non-volatile memory (e.g., media, storage), a pattern of retrieval of the information stored in memory may be inefficient. Each memory chip is made up of sub-units sometimes referred to as memory banks. Memory banks may share input/output circuitry but may otherwise operate independent of each other. In this way, a computing system may reference a portion of one memory bank without referencing a portion of another memory bank. A memory unit may be a single memory chip or a collection of memory chips. Memory units may be thought to be made up of memory "banks." Since memory banks may operate independently, a read or write instruction to one memory bank may proceed to execute while another memory bank is busy processing a previous read/write instruction. This means that a memory chip may operate simultaneous operations in multiple banks. However, if operations are issued to the same bank, the memory chip may wait to process next operation until any previous operations are finished. Thus, a read/write speed of a given memory system (e.g., one or more memory units) may depend on how data being transferred to/from the memory is distributed across different banks. For example, if all data is stored in the same bank, a total duration of time used for performing memory operations is expected to be longer relative to a total duration of time used for performing memory operations when the data is stored and/or distributed across multiple banks.

In storage systems, an address translation table may be used to map memory addresses from logical to physical addresses. For example, data (e.g., the information stored in the memory) may be mapped from logical to physical addresses of the memory using a logical-to-physical (L2P) translation table. Over time, some physical addresses of the memory may be accessed more often than other physical addresses of the memory in response to memory access patterns, which may age portions of the memory corresponding to the more accessed physical addresses at a relatively faster rate than other portions of the memory. Uneven aging of a memory is generally undesirable. A more efficient memory accessing operation may be desired to improve memory management operations (e.g., improve performance, reduce an amount of time used to perform memory operations) and improve wear leveling (e.g., reduction of uneven access patterns, evening out of access patterns as to promote even aging of the memory).

BRIEF DESCRIPTION OF THE DRAWINGS

Various aspects of this disclosure may be better understood upon reading the following detailed description and upon reference to the drawings in which.

DETAILED DESCRIPTION

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, hardware of a computing system includes processing circuitry and memory implemented using one or more processors and/or one or more memory devices (e.g., as chips, as integrated circuits). During operation of the computing system, the processing circuitry may perform various operations (e.g., tasks) by executing corresponding instructions, for example, based on a user input to determine output data by performing operations on input data. To facilitate operation of the computing system, data accessible to the processing circuitry may be stored in a memory device, such that the memory device stores the input data, the output data, data indicating the executable instructions, or any combination thereof.

Additionally, in some instances, memory devices may be implemented using different memory types. For example, a memory device may be implemented as volatile memory, such as dynamic random-access memory (DRAM) or static random-access memory (SRAM). Alternatively, the memory device may be implemented as non-volatile memory, such as flash (e.g., NAND, NOR) memory, phase-change memory (e.g., 3D XPoint™), or ferroelectric random access memory (FeRAM). In any case, memory devices generally include at least one memory die (e.g., an array of memory cells configured on a portion or "die" of a semiconductor wafer) to store data bits (e.g., "0" bit or "1" bit) transmitted to the memory device through a channel (e.g., data channel, communicative coupling, bus interface) and may be functionally similar from the perspective of the processing circuitry even when the memory devices include different memory types.

During operation of the host device, applications or programs of the host device, or other components of the host device, may generate or access information stored in the memory. Information stored as the data within the memory may be stored at physical locations. These physical locations within the memory may be accessed by components of the host device via referenceable logical addresses. A memory controller may control operation of the memory and/or act as an intermediary device between the memory and the host device. In this way, when the memory receives a command from the host device, the command may include an instruction (e.g., read instruction, write instruction) and an indication of a logical address (e.g., a string of bits that indicate a location in memory that the component of the host device desires to access). The memory controller, after receiving the command, may reference a logical-to-physical translation table (L2P table) to determine the physical address that corresponds to the logical address of the command, where the physical address is the physical location within the memory at which the host device desires to access with the command.

Over time, some physical addresses of the memory may be accessed more often than other physical addresses of the memory. Unequal access distributions and/or uneven access patterns of accessing the memory may age some portions of the memory at a relatively faster rate than other portions of the memory. Uneven aging of the memory is generally undesirable since it may shorten a lifespan of a device and operations to even aging of the memory (e.g., evening access to the memory) may be referred to as "wear leveling" operations.

As described herein, to compensate for memory access patterns, such as to reduce uneven wear from uneven memory accesses and/or to improve a total duration of time used to process memory commands, the memory controller may adjust the L2P table based on commands issued by the host device. For example, the memory controller may adjust the L2P table with consideration for physical addresses that are accessed relatively more often than other physical addresses and/or with consideration for logical addresses that are commonly access sequential, or a duration of time subsequent to each other such that processing of a first command is still ongoing as to delay an initiation of processing of the subsequent command. By adjusting the L2P table based on address access patterns (e.g., traffic patterns), the memory controller may preemptively reduce or eliminate uneven wear and promote wear leveling and/or may improve speeds of performing memory operations (e.g., by increasing a number of memory accesses that may be performed in parallel). In some embodiments, the memory controller may also consider performance when adjusting the L2P table to improve (e.g., make more even) physical address access distributions and to improve wear leveling (e.g., make accesses more equal in number).

In this way, the L2P translation may be used to improve performance of a memory system (e.g., reduce a time used to perform memory operations). Since the L2P table provides the ability to store data in arbitrary physical locations in memory while the data may still be in contiguous logical address space, the L2P table may be leveraged to optimize and/or improve memory access patterns. In some cases, an optimal data storage pattern is memory access dependent, thus each software application of a computing system (e.g., each software application that has or uses access to the memory system) may have its own optimal pattern. Thus, in some embodiments, the memory system and/or the computing system may analyze software application access of the memory system to determine traffic patterns. Through deployment of deep learning algorithms, the traffic patterns may be used to generate L2P translation tables designed to improve access of the memory system based on actual access tendencies of the software application.

In some cases, a L2P table may be generated that represents an optimum behavior or relatively improved performance for multiple software applications. The L2P table generated based on traffic patterns for two or more software applications may be used and/or accessed as a default L2P table for the memory system. By using L2P tables adjusted based on traffic patterns of software application, performance of the memory system may improve since logical addresses that are relatively frequently accessed subsequent to one another may be defined to reference physical addresses in different banks. These L2P tables may also be used to manage wear levelling, such as by distributing memory access across one or more memory banks. Furthermore, it is noted that since these wear levelling algorithms modify the L2P table during operation of the memory system to optimize for wear levelling and/or expected sequence of memory accesses, memory operations do not need to be delayed while these determinations are being performed.

Figure 1:
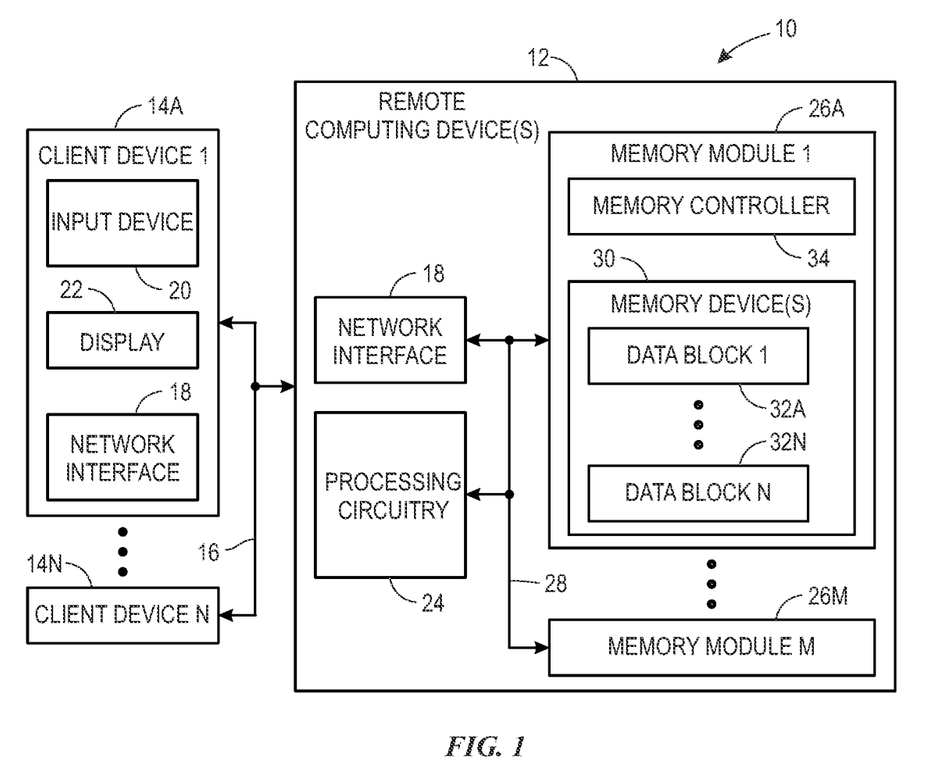
FIG. 1 is a block diagram of a computing system that includes client devices and one or more computing devices, in accordance with an embodiment.

To help illustrate, FIG. 1 depicts an example of a computing system 10, which includes one or more remote computing devices 12. As in the depicted embodiment, the remote computing devices 12 may be communicatively coupled to the one or more client devices 14 via a communication network 16. It should be appreciated that the depicted embodiment is merely intended to be illustrative and not limiting. For example, in other embodiments, the remote computing devices 12 may be communicatively coupled to a single client device 14 or more than two client devices 14. Furthermore, depending on the computing system 10, the memory controller 34 may not be just on the memory module 26. In this way, depicted is a generic use of the described techniques where the memory controller 34 is wholly on the memory module 26. However, other examples may include a memory controller without a memory module and/or may use a processing circuit 24 as the memory controller 34.

In any case, the communication network 16 may enable data communication between the client devices 14 and the remote computing devices 12. In some embodiments, the client devices 14 may be physically remote (e.g., separate) from the remote computing devices 12, for example, such that the remote computing devices 12 are located at a centralized data center. Thus, in some embodiments, the communication network 16 may be a wide area network (WAN), such as the Internet. To facilitate communication via the communication network 16, the remote computing devices 12 and the client devices 14 may each include a network interface 18.

In addition to the network interface 18, a client device 14 may include input devices 20 and/or an electronic display 22 to enable a user to interact with the client device 14. For example, the input devices 20 may receive user inputs and, thus, may include buttons, keyboards, mice, trackpads, and/or the like. Additionally or alternatively, the electronic display 22 may include touch sensing components that receive user inputs by detecting occurrence and/or position of an object touching its screen (e.g., surface of the electronic display 22). In addition to enabling user inputs, the electronic display 22 may facilitate providing visual representations of information by displaying a graphical user interface (GUI) of an operating system, an application interface, text, a still image, video content, or the like.

As described above, the communication network 16 may enable data communication between the remote computing devices 12 and one or more client devices 14. In other words, the communication network 16 may enable user inputs to be communicated from a client device 14 to a remote computing device 12. Additionally or alternatively, the communication network 16 may enable results of operations performed by the remote computing device 12 based on the user inputs to be communicated back to the client device 14, for example, as image data to be displayed on its electronic display 22.

In fact, in some embodiments, data communication provided by the communication network 16 may be leveraged to make centralized hardware available to multiple users, such that hardware at client devices 14 may be reduced. For example, the remote computing devices 12 may provide data storage for multiple different client devices 14, thereby enabling data storage (e.g., memory) provided locally at the client devices 14 to be reduced. Additionally or alternatively, the remote computing devices 12 may provide processing for multiple different client devices 14, thereby enabling processing power provided locally at the client devices 14 to be reduced.

Thus, in addition to the network interface 18, the remote computing devices 12 may include processing circuitry 24 and one or more memory modules 26 (e.g., sub-systems) communicatively coupled via a data bus 28. In some embodiments, the processing circuitry 24 and/or the memory modules 26 may be implemented across multiple remote computing devices 12, for example, such that a first remote computing device 12 includes a portion of the processing circuitry 24 and the first memory module 26A, while an Mth remote computing device 12 includes another portion of the processing circuitry 24 and the Mth memory module 26M. Additionally or alternatively, the processing circuitry 24 and the memory modules 26 may be implemented in a single remote computing device 12.

In any case, the processing circuitry 24 may generally execute instructions to perform operations, for example, indicated by user inputs received from a client device 14. Thus, the processing circuitry 24 may include one or more central processing units (CPUs), one or more graphics processing units (GPUs), one or more processor cores, or any combination thereof. In some embodiments, the processing circuitry 24 may additionally perform operations based on circuit connections formed (e.g., programmed) in the processing circuitry 24. Thus, in such embodiments, the processing circuitry 24 may additionally include one or more application specific integrated circuits (ASICs), one or more field programmable logic arrays (FPGAs), or any combination of suitable processing devices.

Additionally, a memory module 26 may provide data storage accessible to the processing circuitry 24. For example, a memory module 26 may store data received from a client device 14, data resulting from an operation performed by the processing circuitry 24, data to be input to the operation performed by the processing circuitry 24, instructions executable by the processing circuitry 24 to perform the operation, or any combination thereof. To facilitate providing data storage, a memory module 26 may include one or more memory devices 30 (e.g., chips or integrated circuits). In other words, the memory devices 30 may each include a tangible, non-transitory, computer-readable medium that stores data accessible to the processing circuitry 24.

Since hardware of the remote computing devices 12 may be utilized by multiple client devices 14, at least in some instances, a memory module 26 may store data corresponding to different client devices 14. In some embodiments, the data may be grouped and stored as data blocks 32. In fact, in some embodiments, data corresponding with each client device 14 may be stored as a separate data block 32. For example, the memory devices 30 in the first memory module 26A may store a first data block 32A corresponding with the first client device 14A and an Nth data block 32N corresponding with the Nth client device 14N. One or more data blocks 32 may be stored within a memory die of the memory device 30.

Additionally or alternatively, in some embodiments, a data block 32 may correspond to a virtual machine (VM) provided to a client device 14. In other words, as an illustrative example, a remote computing device 12 may provide the first client device 14A a first virtual machine via the first data block 32A and provide the Nth client device 14N an Nth virtual machine via the Nth data block 32N. Thus, when the first client device 14A receives user inputs intended for the first virtual machine, the first client device 14A may communicate the user inputs to the remote computing devices 12 via the communication network 16. Based at least in part on the user inputs, the remote computing device 12 may retrieve the first data block 32A, execute instructions to perform corresponding operations, and communicate the results of the operations back to the first client device 14A via the communication network 16.

Similarly, when the Nth client device 14N receives user inputs intended for the Nth virtual machine, the Nth client device 14N may communicate the user inputs to the remote computing devices 12 via the communication network 16. Based at least in part on the user inputs, the remote computing device 12 may retrieve the Nth data block 32N, execute instructions to perform corresponding operations, and communicate the results of the operations back to the Nth client device 14N via the communication network 16. Thus, the remote computing devices 12 may access (e.g., read and/or write) various data blocks 32 stored in a memory module 26.

To facilitate improving access to stored data blocks 32, a memory module 26 may include a memory controller 34 that controls storage of data in its memory devices 30. In some embodiments, the memory controller 34 may operate based on circuit connections formed (e.g., programmed) in the memory controller 34. Thus, in such embodiments, the memory controller 34 may include one or more application-specific integrated circuits (ASICs), one or more field programmable logic gate arrays (FPGAs), or any combination of suitable processing devices. In any case, as described above, a memory module 26 may include memory devices 30 that use different memory types, for example, which provide varying tradeoffs between data access speed and data storage density. Thus, in such embodiments, the memory controller 34 may control data storage across multiple memory devices 30 to facilitate leveraging the various tradeoffs, for example, such that the memory module 26 provides fast data access speed as well as high data storage capacity.

Figure 2:
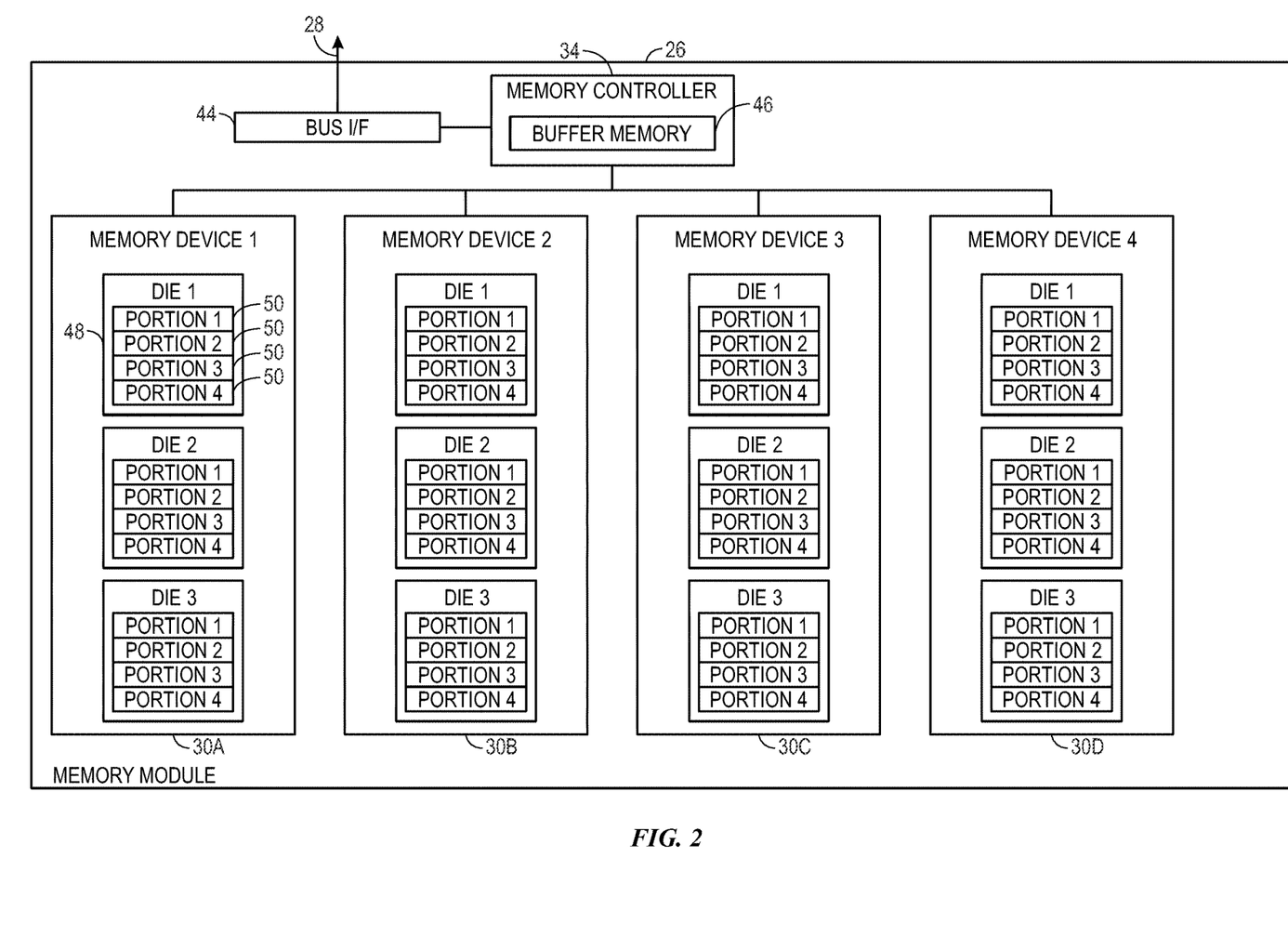
FIG. 2 is a block diagram of a memory module that may be used in a computing device of FIG. 1, in accordance with an embodiment.

To help illustrate, FIG. 2 depicts an example of a memory module 26 including different types of memory devices 30. In particular, the memory module 26 may include one or more non-volatile memory devices 30 and one or more volatile memory devices 30. In some embodiments, the volatile memory devices 30 may be dynamic random-access memory (DRAM) and/or static random-access memory (SRAM). In other words, in such embodiments, the memory module 26 may include one or more DRAM devices (e.g., chips or integrated circuits), one or more SRAM devices (e.g., chips or integrated circuits), or any combination of suitable memory devices.

Additionally, in some embodiments, the non-volatile memory devices 30 may be flash (e.g., NAND) memory, phase-change (e.g., 3D XPoint™) memory, and/or FeRAM. In other words, in such embodiments, the memory module 26 may include one or more NAND memory devices, one or more 3D XPoint™ memory devices, one or more FeRAM memory devices, or any combination of suitable memory devices. In fact, in some embodiments, the non-volatile memory devices 30 may provide storage class memory (SCM), which, at least in some instance, may facilitate reducing implementation associated cost, for example, by obviating other non-volatile data storage devices in the computing system 10.

In any case, in some embodiments, the memory module 26 may include the memory devices 30 on a flat (e.g., front and/or back) surface of a printed circuit board (PCB). To facilitate data communication via the data bus 28, the memory module 26 may include a bus interface 44 (bus I/F). For example, the bus interface 44 may include data pins (e.g., contacts) formed along an (e.g., bottom) edge of the printed circuit board. Thus, in some embodiments, the memory module 26 may be a single in-line memory module (SIMM), a dual in-line memory module (DIMM), or the like.

Additionally, in some embodiments, the bus interface 44 may include logic that enables the memory module 26 to communicate via a communication protocol of the data bus 28. For example, the bus interface 44 may control timing of data output from the memory module 26 to the data bus 28 and/or interpret data input to the memory module 26 from the data bus 28 in accordance with the communication protocol. Thus, in some embodiments, the bus interface 44 may be a double data rate fourth-generation (DDR4) interface, a double data rate fifth-generation (DDR5) interface, a peripheral component interconnect express (PCIe) interface, a non-volatile dual in-line memory module (e.g., NVDIMM-P) interface, a cache coherent interconnect for accelerators (CCIX) interface, or the like.

In any case, as described above, a memory controller 34 may control data storage within the memory module 26, for example, to facilitate improving data access speed and/or data storage efficiency by leveraging the various tradeoffs provided by memory types of the memory module 26. Thus, as in the depicted example, the memory controller 34 may be coupled between the bus interface 44 and the memory devices 30 via one or more internal buses 37, for example, provided as conductive traces formed on the printed circuit board. For example, the memory controller 34 may control whether a data block 32 is stored in the memory devices 30. In other words, the memory controller 34 may transfer a data block 32 from a first memory device 30 into a second memory device 30 or vice versa.

To facilitate data transfers, the memory controller 34 may include buffer memory 46, for example, to provide temporary data storage. In some embodiments, the buffer memory 46 may include static random-access memory (SRAM) and, thus, may provide faster data access speed compared to the volatile memory devices 30 and the non-volatile memory devices 30. The buffer memory 46 may be DRAM or FeRAM in some cases. Additionally, to facilitate accessing stored data blocks 32, the memory module 26 may include an logical-to-physical address translation table (L2P table) and/or other parameters stored in the buffer memory 46, a non-volatile memory device (e.g., a portion of memory devices 30), a volatile memory device (e.g., a portion of memory devices 30), a dedicated address map memory device (e.g., a portion of memory devices 30), or any combination thereof. The other parameters may include a physical experience table that stores parameters and/or data related to operation of the memory module 26 and/or one or more components of the computing system 10.

In addition, the remote computing device 12 may communicate with a service processor and/or a service bus included in or separate from the processing circuitry 24 and/or the data bus 28. The service processor, processing circuitry 24, and/or the memory controller 34 may perform error detection operations and/or error correction operations (ECC), and may be disposed external from the remote computing device 12 such that error detection and error correction operations may continue if power to the remote computing device 12 is lost. For simplicity of description, the operations of the service processor are described as being included in and performed by the memory controller 34, but it should be noted that in some embodiments the error correction operations or data recovery operations may be employed as functions performed by the service processor, processing circuitry 24, or additional processing circuitry located internal or external to the remote computing device 12 or the client device 14.

The memory module 26 is depicted in FIG. 2 as a single device that includes various components or submodules. In some examples, a remote computing device 12 may include one or several discrete components equivalent to the various devices, modules, and components that make up the memory module 26. For instance, a remote computing device 12 may include non-volatile memory, volatile memory, and a controller positioned on one or several different chips or substrates. In other words, the features and functions of the memory module 26 need not be employed in a single module to achieve the benefits described herein.

As described above, the memory module 26 may store information as data in the data blocks 32. Die 48 of the memory module 26 may store the data blocks 32. The data blocks 32 may be stored in one portion 50 of the die 48 or across multiple portions 50. The portions 50 may store any amount of bits, and thus may be designed for a particular application of the memory module 26. As an example, a portion 50 of memory may store 512 megabits (MB). In this way, a portion 50 of memory may be considered a memory cell, a memory bank, a memory partition, a portion of a memory module 26, an entire memory module 26, or the like. As depicted, however, for ease of discussion, the portion 50 may be a portion of memory that is considered smaller than a portion of memory allocated as the die 30.

When the processing circuitry 24 requests access to data stored in the memory module 26, the processing circuitry 24 may issue a command. The command may include an instruction to perform a read operation, such as to operate the memory controller 34 to facilitate the retrieval of information stored in one of the portions 50. Sometimes, the command includes an instruction to perform a write operation, such as to operate the memory controller 34 to facilitate the storage of information in one of the portions 50. Other commands may be used to instruct the memory controller 34 to perform other operations.

Figure 3:
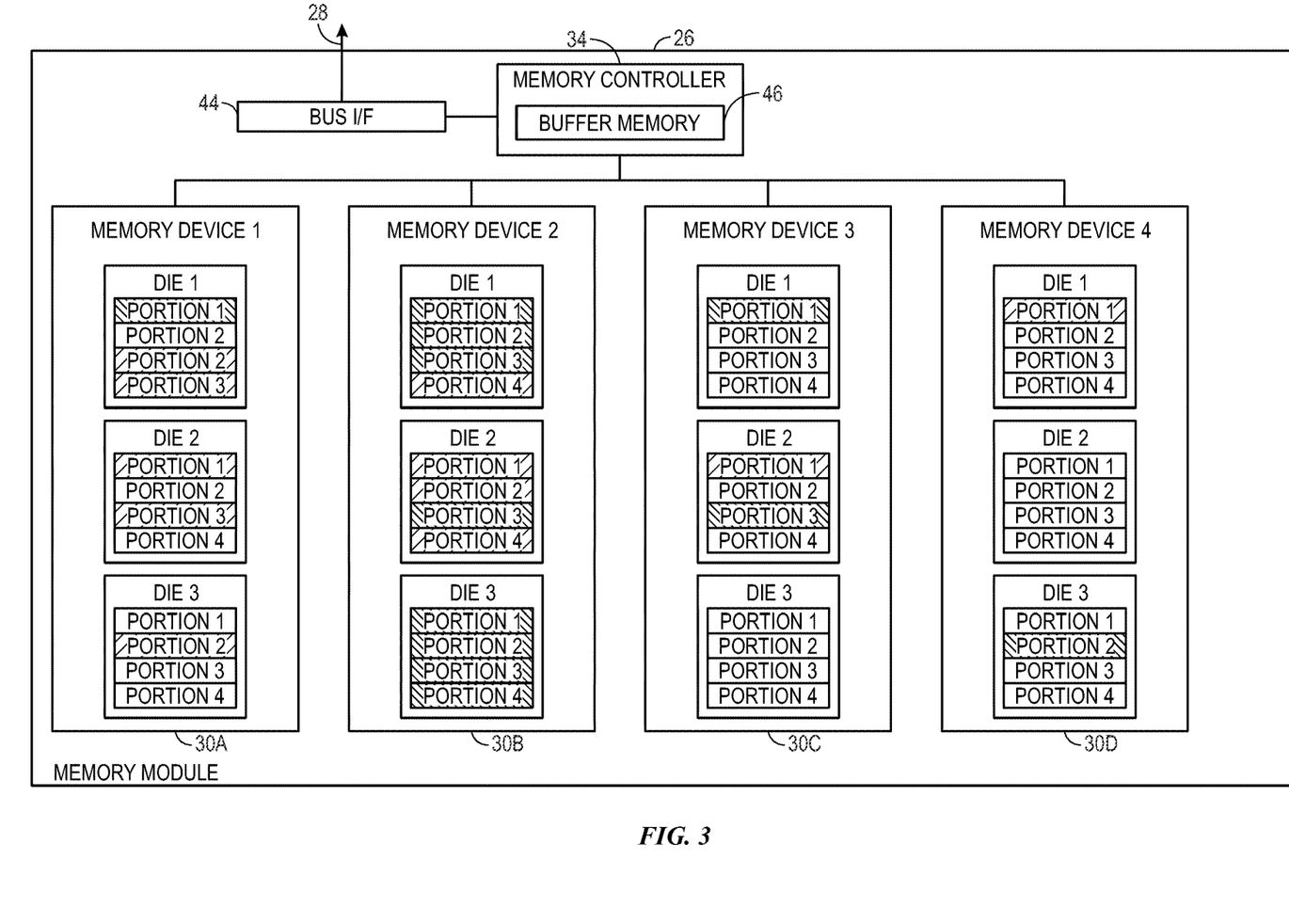
FIG. 3 is a block diagram of the memory module of FIG. 2 after a duration of time such that the memory module is affected by relatively uneven access patterns, in accordance with an embodiment.

Over time, some physical addresses of the memory may be accessed more often than other physical addresses of the memory which may age some portions of the memory at a relatively faster rate than other portions of the memory. To elaborate, FIG. 3 is a block diagram of the memory module of FIG. 2 after a duration of time. The memory module 26 of FIG. 3 may be affected by relatively uneven aging and/or uneven memory accesses, which is illustrated by the use of different shading to emphasize relatively more or relatively less accesses to the portions 50. For example, the memory device 30B was accessed relatively more than the memory device 30D, and thus the portions 50 of the memory device 30B may experience component aging at a faster rate than the portions 50 of the memory device 30D.

To compensate for under-optimized memory accesses, the memory controller 34 may adjust the L2P table based on commands issued by the host device (e.g., historical datasets that are indicative of traffic patterns associated with accesses of the memory controller 34). For example, the memory controller 34 may adjust the L2P table with consideration for physical addresses that are accessed relatively more often than other physical addresses and/or for consideration for physical addresses accessed subsequent to other physical addresses relatively more often. By adjusting the L2P table based on the most frequently accessed physical addresses, the memory controller 34 may preemptively reduce or eliminate uneven aging and/or uneven memory accesses since the adjusted L2P table may make the traffic patterns between portions of memory relatively more even or equal. Additionally or alternatively, by adjusting the L2P table based on frequent subsequently accessed physical addresses, addresses that are expected to be accessed subsequent to each other may be used to address physical locations of memory that are independent from each other, such as different memory banks and/or different portions of memory.

Figure 4:
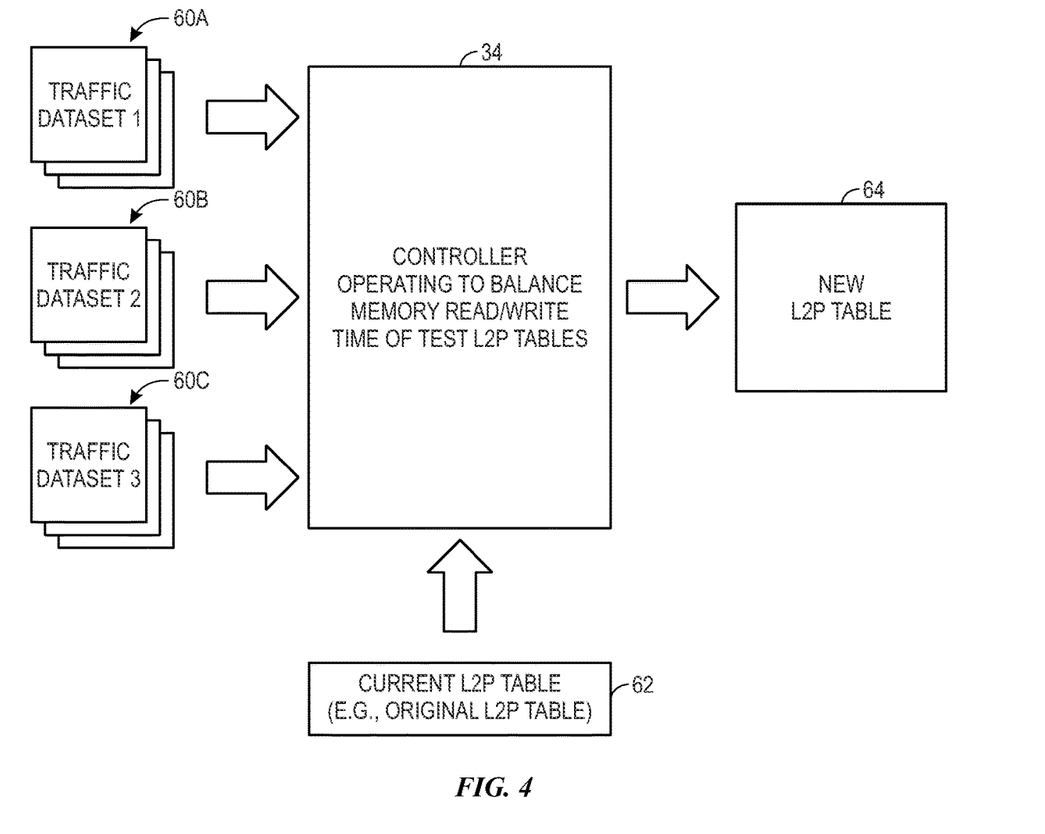
FIG. 4 is an illustration of a controller of the memory module of FIG. 2 operating to adjust a current logical-to-physical table (L2P table) to preemptively compensate for uneven access patterns, in accordance with an embodiment.

An example of the controller 34 operating to compensate for under-optimized memory access patterns is shown in FIG. 4. FIG. 4 is an illustration of the memory controller 34 operating to adjust an original logical-to-physical table (L2P table) to preemptively compensate for frequent sequentially accessed addresses (e.g., memory access patterns). The memory controller 34 may receive as inputs various traffic datasets 60 (60A, 60B, 60C) and a current L2P table 62. The current L2P table 62 may be an original L2P table or may be a previously adjusted L2P table that the memory controller 34 is currently referencing for memory operations (e.g., read operations, write operations).

The memory controller 34 may use the traffic datasets 60 to dynamically alter the current L2P table 62 into a new L2P table 64. To do so, the memory controller 34 may analyze one or more of the traffic datasets 60. From the analysis, the memory controller 34 may learn which portions of the memory module 26 are frequency accessed sequential to each other. For example, the memory controller 34 may analyze one of the traffic datasets 60 to determine that a first portion 50 is frequently accessed right before a second portion 50 is accessed (e.g., sequentially accessed a threshold amount of times). In response to the memory controller 34 identifying portions of the memory module 26 that are accessed more often by a threshold amount of accesses and/or accessed sequentially by a threshold amount of accesses, the memory controller 34 may generate the new L2P table 64 to compensate for these access patterns.

The memory controller 34 may alter L2P mapping of the memory module 26 to compensate for any undesired access patterns. For example, the memory controller 34 may change physical locations addressed by subsequently accessed logical address to reference locations on independently operating portions of memory (e.g., different memory banks, portions of memory on different memory die 50). The memory controller 34 may interchange memory addresses, such that one or more frequently accessed addresses are replaced by less frequently accessed addresses, for example, the most frequently accessed address may be replaced by the least frequently accessed address, the second most accessed address may be replaced by the second least frequently accessed address, and so on.

Portions 50 may be interchanged in some cases, but it should be understood that undesired memory access patterns may be compensated for at any suitable granularity of memory access, such as at the memory die 48 level. In some cases, the memory controller 34 may not be the controller that adjusts the memory access patterns in response to traffic datasets 60. When the controller adjusting the memory access patterns is the processing circuitry 24, or some other system-level controller (e.g., as opposed to memory module-level memory controller 34), the current L2P table 62 may be adjusted to compensate for undesired access patterns between memory modules 26.

Each of the traffic datasets 60 may include real-time traffic data, test traffic data, historical traffic data, or the like. In this way, each of the traffic datasets 60 may be representative traffic samples for a given workload. Real-time traffic data may be information associated with memory read and write operations that is stored and analyzed by the memory controller 34 in real-time, or while the memory read and write operations are ongoing. Memory transactions (e.g., individual read or write operation occurrences) may be recorded by the memory controller 34 over time until a particular amount of memory transaction data is recorded to form a traffic dataset 60 (e.g., 60A, 60B, 60C). The particular amount of memory transaction data may be defined by a threshold, such that the memory controller 34 monitors and records the memory transactions until a number of memory transactions is greater than or equal to a threshold amount of memory transactions. In response to the number of memory transactions being greater than or equal to the threshold amount, the memory controller 34 may associate the memory transactions as part of a traffic dataset 60. In this way, the traffic dataset 60 may indicate real memory operations. When using test traffic data, memory transactions may be simulated or sample sets of data based on real memory transactions or typically expected memory traffic patterns may be used. Furthermore, in some cases, data values which may or may not mimic or represent real memory traffic patterns may be used as the test traffic data, or as typically expected memory traffic patterns. Furthermore, in some cases, the memory controller 34 may store memory transaction data over time, and use the stored memory transaction data as the traffic datasets 60 at a later time, for example several days or months later.

In some embodiments, the memory controller 34 may also consider performance when adjusting the L2P table to improve physical address access distributions (e.g., reduce an amount of sequential accesses to a same portion 50 of memory). For example, the memory controller 34 may use a deep learning operation that uses read or write operation times as a cost (e.g., input) and the new L2P table 64 as a knob (e.g., variable) to adjust to optimize the cost. An example of the deep learning operation may include use of a long short-term memory (LSTM) artificial recurrent neural network. In this way, the memory controller 34 may test various eligible address assignments before selecting a final address assignment combination to be output as the final L2P table 64. The memory controller 34 may determine an arrangement of address assignments that minimizes the cost while maximizing the reassignment of some addresses (in particular, the addresses that relatively more frequently access one-after-another or a duration of time sequentially such that processing of the second command waits until processing of the first command finishes). In this way, the memory controller 34 may consider memory access latencies (e.g., cost defined as read or write operations times) and reassignment percentages (e.g., a percentage of overused or relatively more sequentially-accessed portions of memory reassigned to relatively less sequentially-accessed portions of memory) when reassigning a physical address to a logical address. For example, the memory controller 34 may consider a comparison between a total duration of time used to perform one or more read and/or write operations for a first L2P table adjustment option and for a second L2P table adjustment option to determine which resulting L2P table corresponds to a more suitable adjustment and/or optimization.

When the memory controller 34 uses the deep learning operation, the memory controller 34 may train the final L2P table 64 on one or more traffic datasets 60. A subset of the traffic data of the traffic datasets 60 may be reserved for testing of the trained L2P table 64, such as to verify performance of the adjusted logical-to-physical address assignments. Performance of the trained L2P table 64 may be tested to see how access speeds or access distributions changed after the training or adjustment. For example, the memory controller 34 may verify performance of the new L2P table 64 (e.g., trained L2P table 64) by comparing performance results of the new L2P table 64 to previous performance results of the current L2P table 62 or to a default setting of the logical-to-physical assignments (e.g., an original L2P table for the memory controller 34).

Changes may be applied to the new L2P table 64 over time and/or as part of an iterative process, such as by adjusting a subset of logical addresses from a set of logical addresses to be adjusted. In this way, the memory controller 34 may perform one or more rounds of improvement to the current L2P table 62 such that the new L2P table 64 becomes incrementally improved over time. For example, a first current L2P table 62 may be adjusted and output as a new L2P table 64, which is used at a next iteration as a second current L2P table 62, adjusted, and output as a subsequent new L2P table 64. Any number of iterations may be performed by the memory controller 34 to adjust the current L2P table 62 to compensate for sequential access patterns. In some cases, a threshold number of iterations may be defined and used to control a maximum number of iterations to be performed by the memory controller 34.

Since the memory controller 34 is monitoring accesses and access patterns, the memory controller 34 may preemptively compensate for memory access patterns before the memory access patterns affect components of the computing system 10. For example, when the memory controller 34 adjusts the L2P table before the undesired access patterns affect the memory module 26, sequential accesses may be preemptively (e.g., proactively) prevented since access to the portions of memory is proactively compensated. Preemptive adjustment of the L2P table may occur in response to the memory controller 34 determining that queued commands correspond to non-independent portions of memory and determining to adjust the L2P table to change, for example, a location in memory where to write data as to be able to be performed simultaneous to another memory access.

Figure 5:
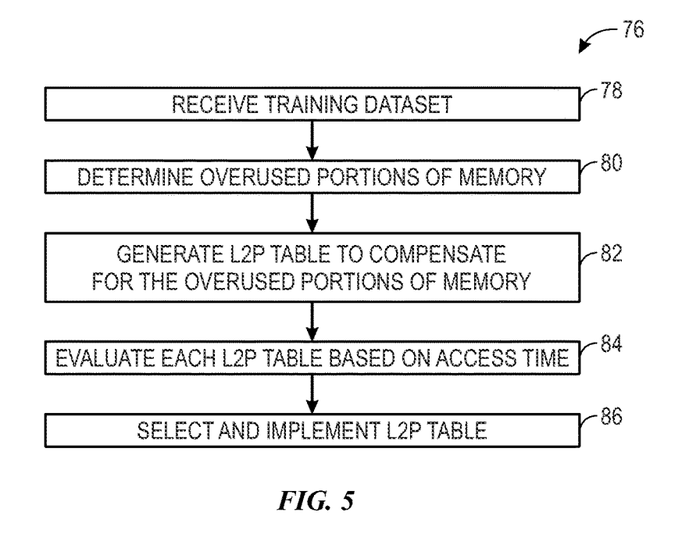
FIG. 5 is a flowchart of a process for operating the controller of FIG. 4 to preemptively compensate for uneven access patterns, in accordance with an embodiment.

To elaborate on example operations of the memory controller 34, FIG. 5 is a flowchart of a process 76 to preemptively compensate for memory access patterns. The memory controller 34 is described below as performing the process 76, but it should be understood that any suitable processing circuitry may additionally or alternatively perform the process 76. Furthermore, although the process 76 is described below as being performed in a particular order, it should be understood that any suitable order may be used to perform individual operations of the process 76.

At block 78, the memory controller 34 may receive a training dataset. The training dataset may include one or more traffic datasets 60 and/or one or more portions of one or more traffic datasets 60. As described above, the traffic datasets 60 may include real-time traffic data, test traffic data, historical traffic data, or the like. In some cases, the memory controller 34 may divide the traffic datasets 60 and/or portions of data of the traffic datasets 60 into training datasets and into testing datasets.

At block 80, the memory controller 34 may use the training dataset and/or the traffic datasets 60 to determine one or more sequentially accessed logical addresses. The memory controller 34 may use thresholds to identify a trend of expected sequentially accessed logical addresses. For example, the memory controller 34 may use a threshold amount of memory accesses to determine when a sequential access pattern occurs enough times to correspond to an expected (e.g., preemptively anticipated) sequential access pattern since a relatively few amount (e.g., less than the threshold amount of occurrences) of sequential accesses of two or more logical addresses may not necessarily benefit from a reassignment or adjustment to the L2P table. The threshold may define a threshold number of memory accesses relative to other amounts of memory accesses. In this way, the memory controller 34 may identify a portion of the memory module 26 that is accessed a number of times greater than a threshold amount relative to a different portion of memory, and thus determine that a first portion of memory (e.g., first portion 50 on same die 48) is accessed sequential to an access of a second portion of memory (e.g., second portion 50 on same die 48).

At block 82, the memory controller 34 may generate a new L2P table 64 to compensate for the sequentially accessed logical addresses. In this way, the memory controller 34 may adjust the logical address to physical address assignments to cause sequentially referenced logical addresses to translate to physical addresses associated with independent portions of memory (e.g., different memory banks, different die 48, different portions 50). As discussed above, the memory controller 34 may interchange physical addresses assigned to logical addresses via the L2P table such that portions 50, die 48, and/or memory devices 30 are accessed in a different pattern according to the same logical addressing. The memory controller 34 may adjust the current L2P table 62 to generate the new L2P table 64 and/or generate a new L2P table 64 independent of an existing data structure storing the current L2P table 62. The memory controller 34, in some cases, may generate a set of eligible new L2P tables 64 and use operations of block 84 to evaluate the set of eligible new L2P tables 64 for selection at block 86. To generate each of the set of eligible new L2P tables 64, the memory controller 34 may systemically change one or more aspects (e.g., variables) of a first new L2P table 64 to test different options for the new L2P table 64. In this way, the memory controller 34 may determine a suitable arrangement of the L2P table that minimizes read or write latencies while improving distributions of logical addresses relatively more frequently accessed of the memory (e.g., reassigning to physical addresses corresponding to independent portions of memory). Thus, the memory controller 34 may adjust the current L2P table 62 to test various eligible address assignments (e.g., set of eligible new L2P tables 64) before selecting a final address assignment combination to be output as the final L2P table 64. For example, in response to determining that the first portion 50 of memory is accessed sequential to the access of the second portion 50 of memory, the memory controller 34 may generate a multiple logical-to-physical tables that each include an assignment of a logical address originally corresponding to a physical address of the first portion 50 of memory to now correspond to a physical address of a third portion 50 of memory (e.g., a portion of memory independent from the second portion 50 of memory).

At block 84, the memory controller 34 may evaluate performance of the set of eligible new L2P tables 64. The memory controller 34 may test each of the set of eligible new L2P tables 64 using a testing dataset (e.g., one or more portions of the traffic datasets 60) to obtain performance metrics. Each performance metric for each of the set of eligible new L2P tables 64 may be compared to a corresponding performance metric for the current L2P table 62 or a default setting for the memory controller 34. The comparison between the performance metrics may yield performance improvement metrics that indicate whether the performance did improve or did not improve (e.g., yielded faster memory accesses, yielded equal memory access speeds with relatively more even access distributions, yielded reduced read or write latencies). A performance improvement metric may indicate an improvement in performance of a particular L2P table of the set of eligible new L2P tables 64. In this way, the memory controller 34 may evaluate the performances of the set of eligible new L2P tables 64 based at least in part on the performance improvement metrics to determine a suitable combination of changes to the current L2P table 62 that yield desirable or maximized performances. In some cases, the memory controller 34 may use a deep learning operation (e.g., LSTM) that uses read or write operation times (e.g., read or write latencies) as a cost and the new L2P table 64 as a knob (e.g., variable) to adjust to optimize the cost.

At block 86, the memory controller 34 may select a final new L2P table 64 from the set of eligible new L2P tables 64 and may use the final new L2P table 64 in the buffer memory 46. Thus, a L2P table may be selected from the multiple L2P tables generated and tested at block 84 to evaluate memory access latencies for each of the multiple L2P tables. The current L2P table 62, in some cases, may be retained in memory as a backup L2P table and/or for future reference. The new L2P table 64 may be written to the buffer memory 46 to overwrite the current L2P table 62. In this way, the memory controller 34 replaces the current L2P table 62 and uses the new L2P table 64 for future memory accesses (e.g., memory controller 34 uses the new L2P table 64). For example, the memory controller 34 may store a first L2P table (e.g., current L2P table 62) as an original logical-to-physical table in the buffer memory 46, generate a second L2P table (e.g., new L2P table 64) using the first L2P table after adjusting the first L2P table, such as at block 82, and may write over the first L2P table in the buffer memory 46 with the second L2P table such that the memory controller 34 uses the second L2P table when performing logical-to-physical address translations.

It is noted that although, in FIG. 1, the client devices 14 are depicted as communicatively coupled to the remote computing devices 12, in some embodiments, the systems and methods described above may be used in a memory controller 34 of the client device 14. The techniques described herein may be used in combination with a variety of memory types and computing structures to achieve the benefits described herein.

In some cases, the memory controller 34 may use traffic datasets 60 that include an indication of a workload type. In this way, resulting new L2P tables 64 may be selected based at least in part on the workload type that operates the memory controller 34. For example, some memory (e.g., memory chips) have a number of memory banks able to operate in parallel, such as sixteen memory banks that sometimes operate in parallel. The current L2P tables 62 for different workloads may be optimized, or designed, to increase the probability that successive commands are for different memory banks, and thus may be executed in parallel, yielding performance improvements of the memory (e.g., faster speed of completing memory transactions). Examples of workflows may include different software applications used by a same computing device and that access, during execution of the software application, the memory module 26. When designing L2P tables for a particular workload, logical addresses may originally reference a physical address of a portion 50 of memory disposed or located within a same memory die 48 or a same memory device 30. During an example workflow, a memory controller 34 may sequentially access logical addresses that reference portions 50 of memory not able to be processed in parallel (e.g., same portions of memory, same memory die 48, same memory device 30. These sequential access patterns involving the logical addresses may be identified, and the logical addresses may be reassigned physical addresses corresponding to portions 50 disposed on or within different memory die 48 or different memory devices 30, such that the logical addresses are assigned to physical addresses referencing independent portions of memory. In this way, the workload that sequentially accesses the logical addresses may cause the memory controller 34 to access the different portions 50 of memory in parallel since the physical addresses reference portions 50 of memory able to be processed in parallel (e.g., since the physical addresses reference portions 50 of memory that operate independent). In some embodiments, a workload type may be identified to the memory controller 34, which is able to preload the selected new L2P table 64 in response to the type of workload. For example, L2P tables 64 may be stored and loaded by a computing device (e.g., memory controller 34 of the computing device) in response to a corresponding software application being executed on the computing device.

In some embodiments, the refinement of a current L2P table 62 (e.g., to generate a new L2P table 64) may be performed after a time of manufacturing during operation of the computing system 10. In this way, the current L2P table 62 may update over time and over the device life of the computing system 10. In some cases, the refinement of the L2P table may be performed while the computing system 10 is in a reduced power mode, is idle, is offline, or is otherwise not accessing the memory module 26, such that the new L2P table 64 may be used by the memory controller 34 without interruption to an ongoing memory process. For example, operations of FIG. 5 may be performed by the memory controller 34 when the memory controller 34 is not in the middle of performing another memory operation (e.g., read operation, write operation, refresh operation).

In some embodiments, determining relatively more accessed portions of the memory module 26 and/or determining a final adjustment to the L2P table may include the memory controller 34 performing a difference analysis to identify differences in access amounts that are greater than a threshold amount of accesses. For example, a first portion 50 may have been accessed 10 times, a second portion 50 may have been accessed 50 times, and the threshold amount of accesses may be a difference equaling 15 accesses. Since the difference between accesses of the first portion 50 and the second portion 50 is 40 and the threshold amount of accesses corresponds to a difference equaling 15 accesses, the memory controller 34 may identify the second portion 50 as relatively more overused. In this way, the memory controller 34 may sometimes adjust the logical address to physical address assignments to cause the less accessed portions of the memory module 26 to be accessed relatively more frequent.

Additionally or alternatively, in some embodiments, identifying overused portions of the memory module 26, at block 80 of FIG. 5, may include identifying physical addresses of the overused portions and/or relatively less used portions of the memory module 26. For example, the memory controller 34 may determine that the first portion 50 is more frequently accessed than the second portion 50 at least in part by analyzing a first number of memory transactions (e.g., memory read operation, memory write operation, memory refresh operation) involving the first portion 50 during a time period, analyzing a second number of memory transactions involving the second portion 50 during the same time period, and determining that the first number is greater than the second number. The time period may be for the same duration of time, such that the time period shares a starting and ending time, and/or the time period may be a same duration of time relative to a start time (e.g., equal durations periods of time that do not necessarily start at a same start time). The time periods may be a monitoring period to use when comparing accesses to portions of memory and/or analyzing traffic patterns associated with memory accesses. It is noted that in some embodiments, counters may be used to count physical address accesses. A counter may count up to a threshold value of accesses or may count down from the threshold value of accesses in response to a particular physical address being accessed. Any suitable type and number of counter may be used, for example, each address may correspond to a counter and/or sets of addresses may correspond to a counter.

Technical effects of the present disclosure may include improving memory operations by compensating for memory access patterns (e.g., uneven access patterns, sequential logical address access patterns) of a memory. A memory controller may identify logical addresses that are frequently accessed sequential to each other and reassign, for the logical address corresponding to the identified sequentially accessed logical addresses, to a different physical address. This may cause the logical address to be reassigned a physical address corresponding to a portion of memory that is less used and/or that correspond to independent portions of memory, thereby permitting parallel memory access operation of the independent portions of memory. The reassignment of logical addresses to new or adjusted physical addresses may be stored in a new and/or updated L2P table. A memory controller managing accesses to memory according to the new and/or updated L2P table may improve performance of the memory system.

With these technical effects in mind, multiple memory devices may be included on a memory module, thereby enabling the memory devices to be communicatively coupled to the processing circuitry as a unit. For example, a dual in-line memory module (DIMM) may include a printed circuit board (PCB) and multiple memory devices. Memory modules respond to commands from a memory controller communicatively coupled to a client device or a host device via a communication network. Or in some cases, a memory controller may be used on the host-side of a memory-host interface; for example, a processor, microcontroller, FPGA, ASIC, or the like may each include a memory controller. This communication network may enable data communication there between and, thus, the client device to utilize hardware resources accessible through the memory controller. Based at least in part on user input to the client device, processing circuitry of the memory controller may perform one or more operations to facilitate the retrieval or transmission of data between the client device and the memory devices. Data communicated between the client device and the memory devices may be used for a variety of purposes including, but not limited to, presentation of a visualization to a user through a graphical user interface (GUI) at the client device, processing operations, calculations, or the like. Thus, with this in mind, the above-described improvements to memory controller operations and memory writing operations may manifest as improvements in visualization quality (e.g., speed of rendering, quality of rendering), improvements in processing operations, improvements in calculations, or the like.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:

determining, via a long short-term memory deep-learning recurrent neural network executed on a memory controller, a first assignment that causes a first logical address to correspond to a first physical address for a first memory portion;

determining, via the long short-term memory deep-learning recurrent neural network executed on the memory controller, a first memory access latency associated with the first assignment based on a first set of memory access patterns;

generating, via the long short-term memory deep-learning recurrent neural network executed on the memory controller, a second assignment that causes the first logical address to correspond to a second physical address for a second memory portion and a third assignment that causes the first logical address to correspond to a third physical address for a third memory portion; and selecting, via the long short-term memory deep-learning recurrent neural network executed on the memory controller, the second assignment or the third assignment based on the first memory access latency, a second memory access latency associated with the second assignment based on a second set of memory access patterns, and a third memory access latency associated with the third assignment based on a third set of memory access patterns.

2. The method of claim 1, wherein the first memory access latency is determined based on a training dataset generated based on the first assignment.

3. The method of claim 2, comprising determining the first set of memory access patterns based on the training dataset, wherein the memory access patterns comprise sequential memory access patterns.

4. The method of claim 2, wherein the training dataset comprises at least a portion of one or more traffic datasets.

5. The method of claim 4, wherein the at least a portion of the one or more traffic datasets comprise real-time traffic datasets, test traffic datasets, historical traffic datasets, or any combination thereof.

6. The method of claim 2, wherein selecting the second assignment or the third assignment comprises determining, via the long short-term memory deep-learning recurrent neural network executed on the memory controller, whether the training dataset indicates that a first number of memory accesses associated with the second assignment, a second number of memory accesses associated with the third assignment, or both, exceed a threshold number of memory accesses.

7. The method of claim 6, comprising:

in response to determining that the first number of memory accesses exceeds the threshold number, selecting the third assignment;

in response to determining that the second number of memory accesses exceeds the threshold number, selecting the second assignment; or in response to determining that the first number of memory accesses and the second number of memory accesses both exceed the threshold number, generating and selecting a fourth assignment.

8. A device, comprising:

a memory comprising a first portion, a second portion, and a third portion; and a memory controller configured to:

determine that the second portion is accessed sequential to the first portion to obtain address access patterns;

determine, via a long short-term memory deep-learning recurrent neural network executed on the memory controller, a first memory access latency associated with a first assignment based on a first set of access patterns, wherein the first assignment causes a first logical address to correspond to a first physical address of the first portion;

generate, via the long short-term memory deep-learning recurrent neural network executed on the memory controller, a second assignment that causes the first logical address to correspond to a second physical address of the second portion, and a third assignment that causes the first logical address to correspond to a third physical address of the third portion; and select the second assignment or the third assignment based on the first memory access latency, a second memory access latency associated with the second assignment based on a second set of access patterns, and a third memory access latency associated with the third assignment based on a third set of access patterns.

9. The device of claim 8, wherein the first assignment corresponds to a first logical-to-physical table, the second assignment corresponds to a second logical-to-physical table, and the third assignment corresponds to a third logical-to-physical table.

10. The device of claim 9, wherein the memory controller comprises a buffer memory configured to store the first logical-to-physical table, the second logical-to-physical table, and the third logical-to-physical table.

11. The device of claim 10, wherein selecting the second assignment or the third assignment comprises causing the second logical-to-physical table or the third logical-to-physical table to overwrite the first logical-to-physical table in the buffer memory.

12. The device of claim 8, wherein the memory controller is configured to:

select the second assignment based at least in part on determining that the first portion is accessed more frequently than the second portion; or select the third assignment based at least in part on determining that the first portion is accessed more frequently than the third portion.

13. The device of claim 8, wherein the first memory access latency, the second memory access latency, the third memory access latency, or any combination thereof is based on address access patterns of the first portion, the second portion, and the third portion.

14. The device of claim 13, wherein the memory controller is configured to determine the address access patterns based on at least a portion of a traffic dataset.

15. The device of claim 13, wherein the memory controller is configured to utilize the long short-term memory deep learning recurrent neural network to obtain the address access patterns.

16. The device of claim 8, wherein the memory comprises a first die comprising the first portion and a second die comprising the second portion.

17. Tangible, non-transitory, computer-readable media comprising instructions configured to cause one or more processors to:
   determine via a long short-term memory deep-learning recurrent neural network executed on a memory controller a first memory access latency associated with a first logical-to-physical table based on a first set of access patterns;
   generate, via the long short-term memory deep-learning recurrent neural network executed on the memory controller, a plurality of logical-to-physical tables;
   determine, via the long short-term memory deep-learning recurrent neural network executed on the memory controller, a plurality of memory access latencies associated with at least a portion of the plurality of logical-to-physical tables;
   select, via the long short-term memory deep-learning recurrent neural network executed on the memory controller, a second logical-to-physical table from the plurality of logical-to-physical tables based on a second memory access latency associated with the second logical-to-physical table based on a second set of access patterns; and
   store, in a memory buffer, the second logical-to-physical table to overwrite the first logical-to-physical table.

18. The tangible, non-transitory, computer-readable media of claim 17, wherein causing the one or more processors to select the second logical-to-physical table comprises determining that the first memory access latency is greater than the second memory access latency.

19. The tangible, non-transitory, computer-readable media of claim 17, wherein causing the one or more processors to generate and select the plurality of logical-to-physical tables comprises repeating the generation and selection of the plurality of logical-to-physical tables until a number of iterations corresponding to a number of repetitions is greater than or equal to a threshold number of iterations.

20. The tangible, non-transitory, computer-readable media of claim 17, wherein causing the one or more processors to overwrite the first logical-to-physical table comprises:
   determining, in the first logical-to-physical table, that a first logical address corresponds to a first physical address for a first memory portion;
   determining, in the first logical-to-physical table, that a second logical address corresponds to a second physical address for a second memory portion; and
   generating the second logical-to-physical table at least in part by reassigning the first logical address to correspond to the second physical address and by reassigning the second logical address to correspond to the first physical address.

* * * * *